UNITED STATES PATENT OFFICE.

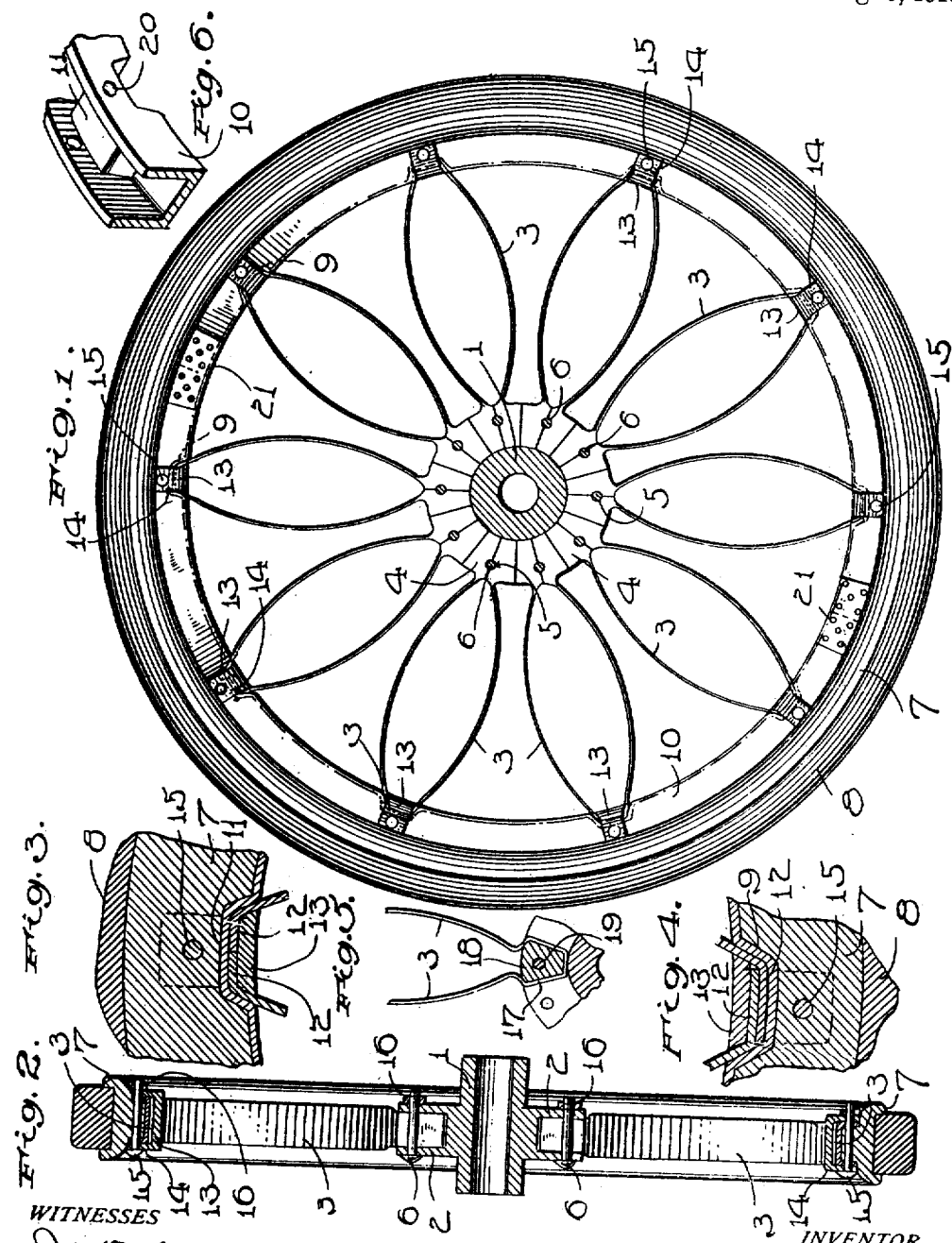

WINFIELD S. HANCOCK, OF WASHINGTON, DISTRICT OF COLUMBIA, ASSIGNOR OF ONE-HALF TO AUGUSTA V. MITCHELL, OF WASHINGTON, DISTRICT OF COLUMBIA.; H. ROZIER DULANY, JR., COMMITTEE OF THE PERSON AND TRUSTEE OF THE ESTATE OF SAID W. S. HANCOCK, TOGETHER WITH SAID A. V. MITCHELL, ASSIGNORS TO THE A. V. M. SPRING WHEEL COMPANY, OF WASHINGTON, DISTRICT OF COLUMBIA, A CORPORATION OF THE DISTRICT OF COLUMBIA.

SPRING-WHEEL.

1,274,877.     Specification of Letters Patent.     Patented Aug. 6, 1918.

Application filed May 28, 1912. Serial No. 700,246.

*To all whom it may concern:*

Be it known that I, WINFIELD S. HANCOCK, a citizen of the United States, residing at Washington, in the District of Columbia, have invented certain new and useful Improvements in Spring-Wheels, of which the following is a specification, reference being had therein to the accompanying drawing.

This invention relates to automobile wheels, and has for its object the production of an efficient resilient automobile wheel, the spokes of which will allow the wheel to yield in order to absorb the shock, as the wheel passes over a rough road.

Another object of this invention is the production of a simple and efficient spring wheel, the spokes of which are so formed on a gradual curve as to allow the shock which will occur as the wheel passes over a rough road to be well distributed over the wheel and prevent the possibility of breaking the springs, as would be the case, if a spring spoke were used having a number of bowed or twisted portions.

With these and other objects in view, this invention consists of certain novel constructions, combinations, and arrangements of parts, as will be hereinafter fully described and claimed.

In the drawings:—

Figure 1 is a side elevation of the wheel.

Fig. 2 is a central vertical section through the wheel.

Fig. 3 is a central longitudinal section through a portion of the rim of the wheel.

Fig. 4 is a transverse section showing a modified form of the manner of connecting the outer ends of the spokes.

Fig. 5 is a modified form of the manner of connecting the inner ends of the spokes to the hub.

Fig. 6 is a detail perspective of a portion of the felly plate which engages the outer end of the spring spokes.

By referring to the drawings, it will be seen that the wheel comprises the hub journal 1 having circumferential flanges 2 spaced so as to constitute a socket for receiving the inner ends of the spokes 3. The inner ends of the spokes are provided with enlarged heads 4, which heads taper toward their inner ends and fit snugly against each other to form a substantially solid hub. The spokes 3 are arranged in pairs so as to constitute substantially elongated oval spoke members. The adjacent faces of the heads of each of the spokes are provided with registering apertures 5, in which apertures fit the bolts 6 for firmly holding the inner ends of the spokes 3 in engagement with the hub 1. These bolts 6 will prevent the inner ends of the spokes 3 from being removed from the hub 1, and will, therefore, constitute a very efficient securing means. It should be understood, however, that in case one of the spokes 3 should become broken or fractured, the same may be removed and another spoke placed therein so as to complete the pair of spokes. These spokes are similarly formed, and therefore may be used interchangeably thereby greatly simplifying the manufacturing of the spokes.

The felly 7 of the wheel carries the usual resilient tire 8 and this felly 7 is provided along its inner face with a plurality of sockets 9. A felly band 10 is carried by the inner face of the felly 7, and this felly band is provided with a plurality of sockets 11 which fit in the sockets 9. This will, therefore, form or constitute a pocket for the outer ends of the spokes 3. Each of the spokes 3 is provided with a lateral foot 12, and these feet 12 of each of the spokes 3 fit in the pocket 11, as indicated in Fig. 3, having their adjacent ends abutting. A substantially U-shaped clamping member 13 is placed over the laterally extending feet 12 of the spokes 3, and these feet 12 are firmly held within the socket 11 by means of the clamping plates 13. These clamping plates 13 are provided with parallel side members 14, which side members are firmly held in engagement with the felly 7, by means of bolts 15. It will, therefore, be seen that the clamping plates 13 may not become accidentally removed from the sockets 11, for the reason that the bolts 15 will firmly hold the clamping plate 13 within the socket. It will first be necessary to remove the bolt 15 from the felly to enable the clamping plate 13 to be removed there-from, and when it is desired to replace a new spoke in the wheel, or remove an old one, of course, the clamping plate 13 will first have to be removed in order to allow the foot 12 of the spoke 3 to be displaced from the socket 11. The usual nuts 16 are employed to hold the bolts 6 and 15 firmly in their place.

As illustrated in Fig. 4, the feet 12 of the spokes 3 may be overlapped, and in this manner held firmly in the socket 11 by means of the clamping plate 13. The plate 13 in each instance is formed similar to that above described.

In Fig. 5 there is shown an embodiment of the invention wherein the pairs of spokes 3 are formed in one piece having a loop head 17 formed so as to fit over a filler block 18. This filler block is held in place by means of a bolt 19 passing through the flanges 2 of the hub 1, and this head 17 and block 18 taper toward their inner ends so as to lower the inner ends of the spokes 3 to fit snugly together in the same manner as illustrated in Fig. 1. In the structure as illustrated in Fig. 5, if one portion of the spoke 3 should break, the entire spoke would have to be removed, and a new pair substituted therefor, but in the embodiment, as illustrated in Fig. 1, each spoke 3 may be separately removed or inserted independently of the other spoke 3 of the same pair.

From the foregoing description, it will be seen that a very efficient and durable structure has been produced which will facilitate the removal of the spokes from the wheel in case one of the spokes should become broken or unfit for use, and, furthermore, owing to the gradual elongated curved construction of the spokes, it will be seen that the pressure upon the wheel will be gradually taken up throughout the entire length of the spoke. From actual experience with spring wheels, it will be noted that where spokes are employed, formed of a number of convolutions, or a number of bowed portions, these bowed portions tend to weaken the spoke owing to the fact that the spoke is very likely to become congested at its bowed portion thereby causing the resiliency of the spoke to be taken up by only one or more of the small convolutions. In the present device, illustrated, this objectionable feature is overcome, owing to the gradual tapering or bowed spokes and it should be understood that by the present structure illustrated and described, the gradual compression of the wheel may take place whereby the pressure will be taken up by the whole wheel, and will not depend upon one of the spokes alone.

As illustrated in Fig. 6, the felly band 10 comprises a substantially U-shaped body in cross section, the sockets 11 being formed by punching the outer portion of the felly band inwardly as indicated in Fig. 6. The side flanges 14 of the clamping plates 13 straddle the sides of the felly band 10, and the bolts 15 pass through the apertures 20 formed in the side flanges of the felly band. This felly band 10 is formed in a pair of sections having its adjacent ends connected by means of connecting plates 21, thereby facilitating the placing of the band 10 upon the felly and also facilitating the removal thereof from the felly.

What is claimed is:—

1. A spring wheel of the class described comprising a hub, a felly, a felly plate positioned upon said felly and provided with a plurality of sockets formed therein having open sides, the ends of said sockets being beveled, sectional spokes secured to said hub and provided with inwardly bent feet adapted to fit in said sockets, said spokes adapted to lie snugly against the beveled ends of said sockets, a clamping plate straddling said sockets and engaging said inwardly extending feet of said spokes, said clamping plate provided with beveled sides adapted to hold said sectional spokes snugly in engagement with said beveled ends of said sockets whereby said spokes will be held against yielding movement relative to said sockets, said clamping plates provided with parallel flanges, said flanges projecting beyond the depth of said sockets, and means passing transversely through said felly and through said flanges for firmly holding said flanges in engagement with said felly and holding said clamping plate against accidental removal from said felly, the inner edge of said clamping plate being on the same plane with the inner edge of said felly plate.

2. A spring wheel of the class described comprising a hub, a felly plate, said felly plate provided with a circumferential rib upon its inner face, a substantially U-shaped channel plate positioned upon said rib, said rib provided with a plurality of notches, socket portions struck from said felly plate and fitting snugly within said notches for holding said plate against circumferential movement relative to said felly, sectional spokes detachably carried by said hub, clamping members straddling the outer ends of said sectional spring spokes for securely holding the same in engagement with said felly plate, and means for holding said clamping member in engagement with said felly plate.

In testimony whereof I hereunto affix my signature in presence of two witnesses.

WINFIELD S. HANCOCK.

Witnesses:
IRVING L. MCCATHRAN,
M. C. BECKER.